March 30, 1965  R. E. NEITZEL  3,176,169
MHD INDUCTION DEVICE

Filed June 29, 1960  4 Sheets-Sheet 1

Inventor
Robert E. Neitzel
by I. David Blumenfeld
His Attorney.

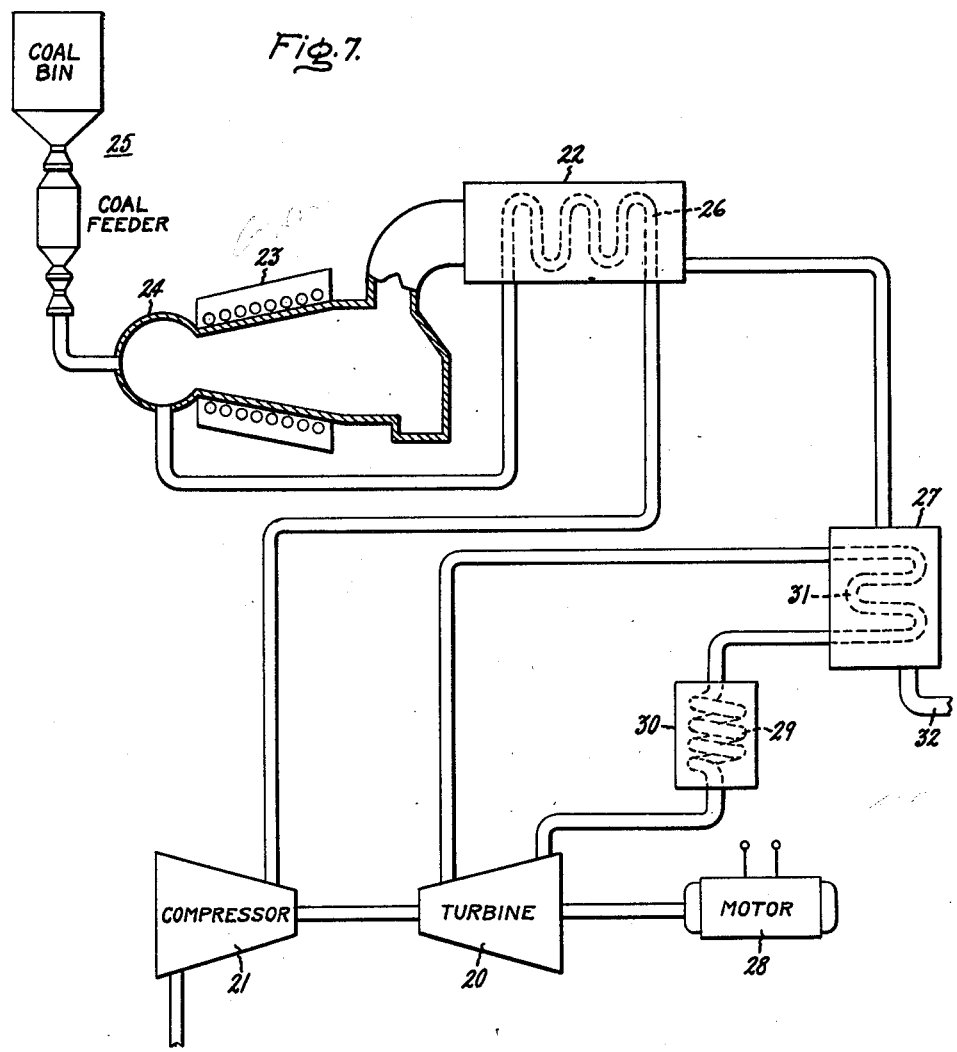

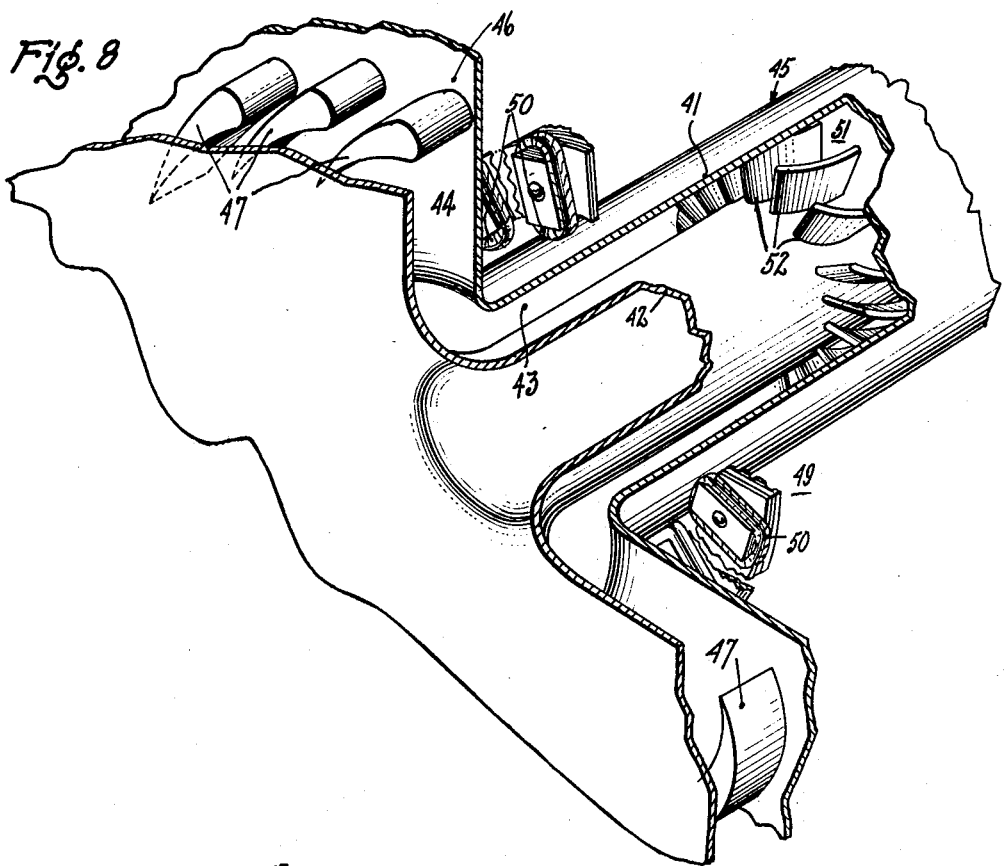
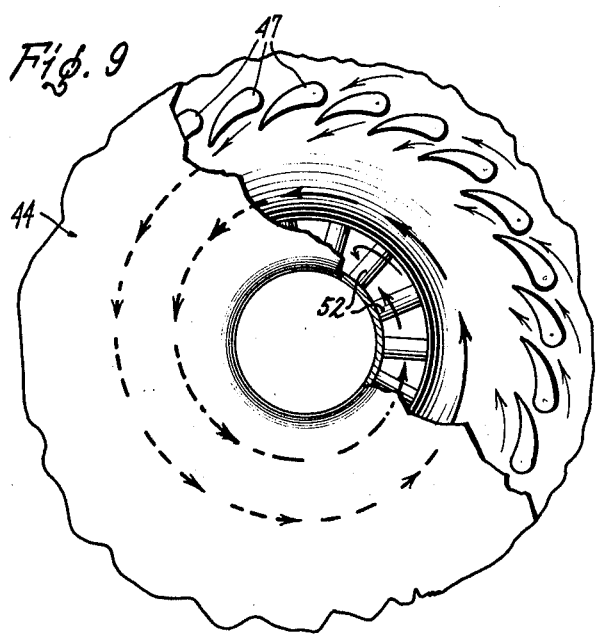

Patent 3,176,169

3,176,169
MHD INDUCTION DEVICE
Robert E. Neitzel, Wyoming, Ohio, assignor to General
Electric Company, a corporation of New York
Filed June 29, 1960, Ser. No. 39,576
2 Claims. (Cl. 310—11)

This invention relates to a method and apparatus for generating electrical power, and more particularly, generating alternating current power by the interaction of a moving conductive fluid and a magnetic field.

The body of scientific knowledge dealing with the interaction of a conducting fluid with a magnetic field is commonly known as magnetohydrodynamics (usually abbreviated to MHD) and all subsequent references in this specification to the generation of electrical power by the interaction of a moving conductive fluid and a magnetic field will be to magnetohydrodynamic generation or MHD generation.

An MDH device for generating alternating current by induction has been proposed in which energy is abstracted from a moving conductive fluid by driving a hot partially ionized gas through a shaped magnetic field. The interaction of the gas and the field produces a circulating current in the gas which circulating current generates an alternating output by induction. In one embodiment the ionized gas flows through a cylindrical annulus between a central radial iron core and an external laminated iron core magnetic structure. A time varying radial magnetic field is impressed on the annular gas flow path and establishes a circulating current in the annulus which induces a single phase A.C. E.M.F. in a suitably positioned output or pickup winding. Polyphase A.C. may be generated by causing the applied field to vary sinusoidally along the annulus axis to produce in effect a travelling magnetic field. The magnetic field moves in the axial direction at a velocity which is less than the fluid velocity so that energy is abstracted from the moving conducting gaseous medium and is converted by induction to polyphase A.C. power. Such an MHD generating system is disclosed and claimed in concurrently filed application entitled "MHD Induction Device" filed in the name of Emmeth A. Luebke, Serial No. 39,590, filed June 29, 1960, which is assigned to the assignee of the present invention.

The MHD induction generator referred to above contemplates generating polyphase power by producing a linearly moving radial magnetic field which interacts with the conducting gaseous medium to produce the desired polyphase A.C. power. Under some circumstances, however, it may be desirable to utilize a rotating magnetic field to interact with the conducting gaseous medium rather than a linear travelling magnetic field.

It is an object of this invention, therefore, to provide an MHD induction generator which utilizes a rotating magnetic field.

A further object of this invention is to provide a polyphase MHD induction generator utilizing a rotating magnetic field.

Other objects and advantages of the invention will become apparent as the description thereof proceeds.

The various objects and advantages of this invention are realized, in one embodiment thereof, by passing a heated conductive gaseous medium through a device such as a nozzle which imparts a high tangential velocity to the medium. The gas in passing through the duct therefore has a substantial rotational component of velocity. A rotating magnetic field is impressed on the duct and interacts with the rotating gas to produce a circulating current in the gas which in turn interacts with the field windings to generate polyphase A.C.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 7 is a schematic illustration of a complete power plant system utilizing an MHD generator;

FIG. 8 is a partially broken away isometric perspective of an alternative form of an MHD generator; and FIG. 9 is a partially broken away end view of the MHD device of FIG. 8.

Figure 1:
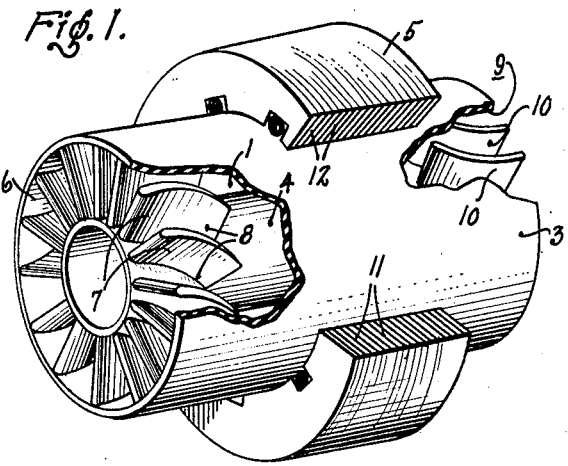
FIG. 1 is an isometric perspective of an MHD generator constructed in accordance with the invention.

Before discussing an MHD generator constructed according to the principles of this invention, it will be illuminating to discuss some pertinent physical properties of gaseous fluids, the conditions under which they become conductive; and the manner in which this conductive condition may be achieved to facilitate interaction with a magnetic field. The basic properties of pure gases or of gas mixtures such as air are such that under normal circumstances of temperature and pressure the conductivity of the gas is so low that for all practical purposes the gas is non-conductive. Hence, under normal conditions of temperature and pressure no interaction between the gas and a magnetic field is possible for the purpose of generating power. To achieve any perceptible results in generating power, the conductivity of the gaseous fluid must be increased. A preferred method for increasing the conductivity of gaseous fluid is by partially ionizing the gas. This causes a fraction of the gas molecules to lose one or more electrons and the charged particles so produced are free to drift through the gas and give rise to current conduction by interaction with a magnetic field.

Among the available methods for ionizing a gas are such schemes as thermal ionization, electric field ionization, X-ray ionization, arc discharge ionization, etc. Because of the relative ease and effectiveness with which it may be carried out, however, the preferred method for MHD generation is by thermal ionization, i.e., adding heat energy to the gas until some of the molecules lose electrons. The thermal ionization process is, however, severely temperature dependent, and is also a discontinuous phenonemon; i.e., there is a critical limiting threshold temperature below which no ionization takes place. The ionization energy, by which is meant the thermal energy increment which must be added to the molecules to initiate ionization and remove one or more of its electrons, is quite high for most gases. Common gases, such as air, CO, $CO_2$, as well as noble gases, show no perceptible ionization unless the gas is heated above a threshold temperature of approximately 3500° K. (5800° F.). It will be appreciated, therefore, that the problems involved in heating the gas to a minimal threshold operation temperature of 3500° K. or higher are substantial both in terms of the magnitude of the effort required to heat the gas and in terms of the problem of finding materials capable of withstanding such temperatures.

Fortunately, these difficulties may be greatly reduced by a technique which substantially lowers the critical threshold temperature for ionization and correspondingly lowers the magnitude of the effort required to bring the gas to the operating temperature. It has been found that adding a small amount, in the range of 0.1 to 1% by volume, of some easily ionizable material, such as alkaline metal vapor, for example, reduces the threshold ionization temperature by as much as 40–50%. For example, the addition of 1% or less by volume of potassium, reduces the critical ionization threshold temperature from 3500° K. (5800° F.) to 2000° K. (3600° F.). Cesium ($C_s$), potassium carbonate ($K_2CO_3$), cesium carbonate ($C_sCO_3$ are additional examples of alkaline metal vapors or compounds which are equally effective in reducing the threshold ionization temperature of gas. For a more thorough discussion of electrical conductivity by thermal ionization, reference is hereby made to an article entitled "Electrical Conductivity of Thermally Ionized Air Produced In a Shock Tube," Lamp, Lawrence, and Lynn, Journal of Applied Physics, volume 28, July 1957.

The gas which has been brought to a conductive state by such a combination of heating and "seeding" is now in suitable condition for interacting with a magnetic field and, in accordance with the principles of the invention, flows through an annular interaction space 1 of an MHD generator such as is illustrated diagrammatically in FIG. 1. A rotational component of velocity is imparted to the gas to interact with a rotating magnetic field impressed on the passage 1. Passage 1 is defined by two coaxial cylindrical members 3 and 4. Outer cylinder 3 is partially surrounded by a laminated magnetic structure 5, to be described presently, which impresses the rotating field on the interaction space 1. The cylinders 3 and 4 are constructed of heat resistant refractory material capable of withstanding the effect of the elevated temperatures without deteriorating. For the sake of simplicity of illustration cylinders 3 and 4 are shown as integral members; in actuality the cylinders may be constructed of a plurality of small interlocking pieces as described in the above identified copending Luebke application. In addition, cylinder 3 may be surrounded by a structural supporting wall, not shown, of a nonmagnetic material such as stainless steel.

The high temperature refractory cylinders which are in direct contact with the heated gases must be temperature resistant to withstand the high temperature to which it is exposed. Refractory materials such as zirconium oxide, for example, are particularly suitable for fabricating the cylinders 3 and 4. Refractories such as zirconium oxide are chosen because their melting point is higher than the operating temperatures of the gas and they do not deteriorate on contact with the hot gases. Many other refractory materials having similar temperature resistant properties are available and may be used in constructing the cylinders 3 and 4. Thoria, tungsten, and tungsten carbide are a few examples of suitable alternative materials for the cylinders 3 and 4. Some of the pertinent physical properties of these materials are tabulated below:

PHYSICAL PROPERTIES

| MATERIAL | Approx. Melting Point, ° K. | Coef. of Thermal Exp. in./in., ° C. at Room Temperature |
| --- | --- | --- |
| Zirconium oxide | 2,950 | $6 \times 10^{-6}$ |
| Thoria | 3,225 | $11 \times 10^{-6}$ |
| Tungsten | 3,700 | $6 \times 10^{-6}$ |
| Tungsten Carbide | 3,000 | $6 \times 10^{-6}$ |

It is apparent from column 2 of this tabulation that these materials are suitable for use in MHD devices since the melting points of the materials are higher than the operating temperatures. It will also be observed that the various thermal coefficients of expansion of these materials are such that substantial linear expansion may occur under the expected normal operating temperatures.

It may be necessary, therefore, as was pointed out previously, that the cylinders 3 and 4 be constructed in a manner which compensates for this expansion. One approach for doing so is the one described in the above identified Luebke docket and constitutes forming the cylinders of a plurality of small interlocking pieces which can accommodate this expansion.

The heated gas, which is the working medium of the MHD generator, is brought into the annular passage 1 through an axial nozzle arrangement 6 which expands and imparts a high tangential velocity to the gas as it moves through duct 1. Nozzle 6 comprises a plurality of axially extending blades 7 which define curved nozzle-like passages 8. In flowing through passages 8 the gas is expanded and a tangential component of velocity imparted to it causing it to describe a rotational path in moving down the duct, as illustrated by the arrows in FIG. 1. Magnetic structure 5 and its associated windings produce a rotating magnetic field which travels around the annulus at a linear velocity W. If the rotational velocity component $v_u$ of the gas is greater than the velocity of the magnetic field, i.e., $v_u > w$, energy is abstracted from the gas and is converted to electrical energy in the form of a polyphase A.C. voltage induced in the field windings. The flowing gas passes out of the interaction space 1 and flows through a downstream stator 9 comprising a plurality of vane members 10 which take out the residual swirl from the flowing gas.

Figure 2:
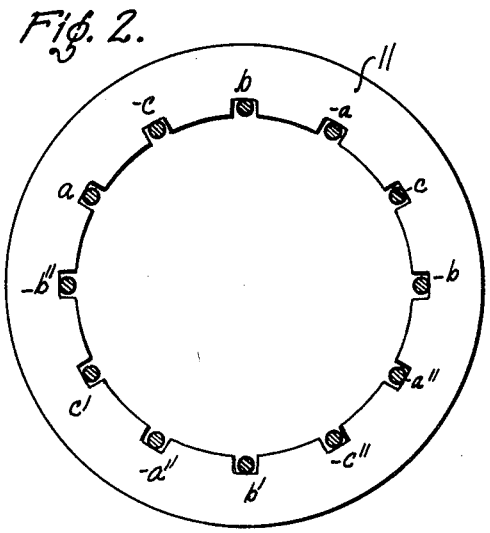
FIG. 2 is a sectional view of the generator of FIG. 1 taken along the lines 2—2.

Magnetic assembly 5 is of laminated construction comprising a plurality of metallic laminations 11 separated by insulating spacers 12. Polyphase windings are distributed around the circumference of the duct and establish the rotating magnetic field previously adverted to. The windings around the annular interaction space, as may be seen most clearly in FIG. 2 provide a 4 pole 3 phase arrangement consisting of 3 sets of interspaced multiturn coil groups, $a$–$b$–$c$, $a'$–$b'$–$c'$, and $a''$–$b''$–$c''$, which, in a manner to be presently described, establish the rotating magnetic field. The opposite coil sides of the multiturn coils, i.e., "$a$" and "$-a$," "$a'$" and "$-a'$," etc. are so wound that the current flows in opposite directions through the opposite coil side pairs "$a$" and "$-a$" etc. The interspaced coil groups are excited by balanced three-phase currents which are displaced 120 electrical degrees in time. Because of the three-phase excitation of the coil groups, a rotating magnetic field is established which moves in the same direction but at a lesser velocity than the tangential velocity of the gas passing through the duct.

Figure 3:
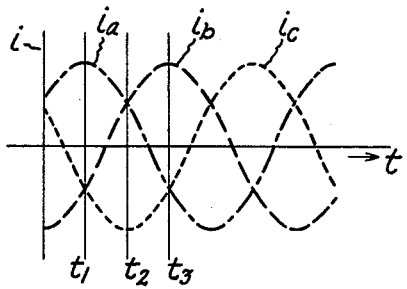
FIGS. 3–6 are waveforms useful in understanding the manner in which the rotating magnetic field impressed on the MHD generator of FIG. 1 is produced.
Figure 4:
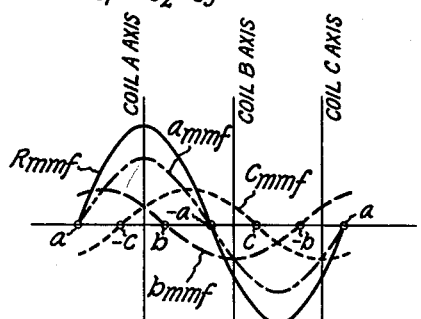
Figure 5:
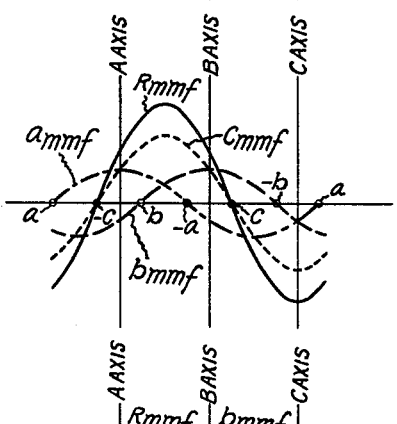
Figure 6:
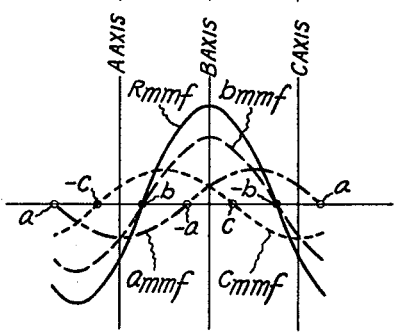

The manner in which the rotating magnetic field is established by the superposition of three time varying M.M.F.'s may be most easily understood in connection with FIGS. 3–6 in which the waveforms established in various portions of the circuit are illustrated. If the interspaced winding groups $a$, $b$, and $c$, are excited by balanced three-phase currents, the instantaneous phase currents $i_a$, $i_b$, and $i_c$ vary with time in the manner shown in FIG. 3. The phase currents $i_a$, $i_b$, $i_c$, flow respectively in the coil groups $a$–$a'$–$a''$, $b$–$b'$–$b''$, and $c$–$c'$–$c''$. These currents are of equal amplitude and the sinusoids are displaced 120 electrical degrees in time, with the particular time phase sequence shown in FIG. 3 being $a$, $b$, $c$. Sinusoidal currents $i_a$, $i_b$, and $i_c$ flowing in the respective coil groups produce magnetomotive forces (M.M.F.'s) which vary with time as do the exciting currents ($a$, etc.). The time varying exciting current and the corresponding time variations of the individual phase M.M.F.'s ($a_{M.M.F.}$, $b_{M.M.F.}$, and $c_{M.M.F.}$) combine to produce a resulting M.M.F. wave $R_{M.M.F.}$ which rotates uniformly around the duct to establish the rotating magnetic field which interacts with the flowing gas. The distribution of the M.M.F.'s in space at three instants of time, $t_1$, $t_2$, $t_3$, is shown in FIGS. 4, 5, and 6 which illustrate graphically the M.M.F. components due to the individual coil groups $a$, $b$, $c$, etc. and the resultant M.M.F. wave. In FIGS. 4, 5, and 6 the space distribution of the three coil groups and their individual coil sides are shown schematically by the small circles "a"–"–a," "b"–"–b," and "c"–"–c" laid out linearly along the abscissa.

At time $t_1$, the current in coil phase $a$ is at a positive maximum, as may be seen in FIG. 3 and the current in coil groups $b$ and $c$ are at their negative half maxima. The corresponding space distribution of the M.M.F. for each of these coil groups are shown in FIG. 4. The component M.M.F. for coil groups $b$ and $c$ are shown with their negative wave centered about the axis of coil groups $b$ and $c$, respectively, since their instantaneous phase currents are negative; and their amplitudes are half of that of coil group $a$, etc. The resultant M.M.F. wave, represented by the solid curve $R_{M.M.F.}$, is obtained by adding the individual contributions of the three coil phases, and is a sinusoidal M.M.F. wave of amplitude $3/2 a_{M.M.F.}$ with its positive half wave centered about the axis of coil phase $a$.

At a later instant $t_2$, the current in coils $a$ and $b$ are at a positive half maxima and at a negative maximum in coil $c$. The individual M.M.F. component wave due to the coil groups have changed in accordance with the new instantaneous exciting currents, but the resultant M.M.F. wave has the same amplitude as at $t_1$. As shown in FIG. 5 by adding the M.M.F. component wave contributed by the individual coil phases at time $t_2$, the resultant M.M.F. wave $R_{M.M.F.}$ is of the same magnitude but is now located at the right of its position at time $t_1$ by 60 electrical degrees in space.

Similarly at a time $t_3$ when the coil group $b$ current is at a positive maximum, and the current in coil groups $a$ and $c$ are at negative half maxima, the resultant M.M.F. wave is again obtained but it has moved 60 electrical degrees still further to the right as is illustrated in FIG. 6. As time passes, the resultant M.M.F. wave retains its form and amplitude but shifts progressively along the line. This shift corresponds to a field rotating uniformly around the circumference of the duct. Since the relation between the flux density B and the M.M.F. field (F) is established by the nature of the gap between the coils and the gaseous conductor, the M.M.F. waves illustrated in FIGS. 4–6 may readily be translated in their corresponding flux density waves by means of the relationship expressed in the equation $$B = \frac{\mu_0 F}{g} \quad (1)$$

where $g$ is the gap length and $\mu_0$ the permeability of the space constituting the gap. The shift of the resultant M.M.F. wave illustrated in FIGS. 4–6 therefore corresponds to a rotating flux wave, i.e., a magnetic field, which rotates at a velocity determined by the frequency of the energizing current and the spacing of the interspaced coil groups. The resulting rotating magnetic field therefore has a velocity W which is made to be less than the rotational velocity of the fluid $v_u$ by a slip velocity $v_s$. This rotating magnetic field interacts with the rotationally moving conducting gaseous fluid so that a circulating current is established within the gas. The circulating current in the gas is accompanied by its own magnetic field which interacts continuously with the rotating magnetic field produced by the interspaced field coils and energy is abstracted from the moving partially ionized gas in the form of an induced polyphase alternating E.M.F. in the coil groups $a$, $b$, and $c$.

This interaction of the rotating magnetic field, the conductive gas, the field due to the circulating current in the gas, and the interspaced coil groups $a$, $b$, $c$, etc. may, for purposes of explaining the operation of the device, be likened to the action of a conventional rotating induction device. A conventional induction device of the "squirrel cage" type, for example, is normally provided with a rotating member having a large number of metallic bars connected at their ends to provide essentially a very low resistance or short circuit path. The conducting gas of the instant invention may be compared to and performs the same function as the rotor bar arrangement in a squirrel cage device. In such rotating induction devices, the relative velocities of the several magnetic fields, i.e., the rotating field due to the circulating current in the rotor bars and that due to the stator winding, establish the operational characteristics of the device; if the rotating magnetic field established by the stator moves at a greater velocity than the magnetic field established by the induced rotor current, the two rotating magnetic fields in trying to align exert a driving torque on the rotor and produce motor action. If, on the other hand, the rotor is driven at a speed greater than that of the rotating armature field, the flux field is cut in the opposite direction and the devices operate as an induction generator. The MHD generator of the instant invention may be considered in an analogous fashion; if the rotating magnetic field established by the coil groups $a$, $b$, $c$, etc. travels faster than the ionized rotating conducting gas, energy is abstracted from the travelling magnetic field and exerts force on the gas pushing it down the interaction space and producing, in effect, a pumping action. The device is, therefore, essentially a motor since electrical energy is converted to mechanical energy. If, on the other hand, as in the instant invention, the conducting gas rotates at a velocity which is larger than the rotational speed of the magnetic field, the fluxes are cut in the opposite direction because of the change in the relative direction of movement of the magnetic fields and the device operates as a generator. By transformer action, the component field produced by this circulating current in the gas induces voltages in coil groups $a$, $b$, $c$, etc., which are substantially 180° out of phase with the energy component of the current existing when the device operates as a pump or motor. Energy is thus abstracted from the moving conducting gaseous stream and added to the coil circuit represented by the interspaced coil groups. There appears, therefore, at the output of the polyphase coil windings $a$, $b$, $c$, etc., a polyphase E.M.F. generated by virtue of the interaction of the moving gaseous stream and these coil windings.

The MHD induction device described above with references to FIGS. 1–6 as well as other forms thereof to be described presently, may form part of one of a number of power plant cycles. Although the power plant cycle is not itself a part of the invention, such a system will be described to provide a complete picture of the invention in its environment.

FIG. 7 illustrates schematically an open cycle power plant incorporating an MHD generator. Incoming air passes through a compressor 21 which is driven by a prime mover such as a conventional steam turbine 20. Air from compressor 21, at 140 p.s.i. and 500° F., is further heated in regenerative heater 22 by the exhaust gases from an MHD generator illustrated at 23 and its temperature raised from 500° F. to approximately 3600° F. The preheated air, at 3600° F. and 140 p.s.i., flows into a combustion chamber 24 where pulverized coal from the bin and automatic feeder arrangement 25 is burned to raise the temperature of the gas to approximately 500° F. After leaving combustion chamber 24 alkaline metal seeding material is injected into the heated air stream by an injection nozzle, not shown, to facilitate the ionization of the gas. The conductive gas passes through an MHD generator shown at 23 and generates a polyphase A.C. voltage in the manner previously described. The extraction of energy from the gas in the form of electricity cools it and reduces its temperature to 400° F. or so. This 400° F. exhaust gas flows to regenerator chamber 22 and preheats the incoming gas passing through the heating coils 26. This reduces the temperature of the exhaust gas further and it exits from chamber 22 at approximately 2000° F.

The still hot gas then flows through a boiler 27 where the remaining thermal energy is abstracted to provide steam for the conventional steam turbine 20. Steam turbine 20, as explained previously, drives compressor 21 and also generates additional electrical power by driving a conventional A.C. generator 28. Exhaust steam from turbine 20 passes through suitable coils 29 of steam condenser 30. The condensate produced there flows through steam coils 31 in boiler 27 where the condensate is reconverted to steam by the 2000° F. exhaust gases passing through the boiler. The steam is then recirculated to drive turbine 20. In passing through boiler 27 the exhaust is cooled from 2000° F. to approximately 300° F. and is exhausted to the atmosphere through a stack 32. It will be apparent that in an open cycle system such as that shown in FIG. 7 the efficiency of the cycle is greatly enhanced by combining the steam turbine 20 with the MHD generator since the energy in the heated exhaust gas from the generator is utilized to generate additional electric power rather than being dissipated by exhausting to atmosphere at 2000° F.

It is to be understood that the MHD generator may be utilized in power plant cycles other than the open cycle system just described. Specifically, a closed cycle system may be utilized wherein a gas other than air is used as the working fluid and is continually recirculated. Such a closed cycle arrangement is particularly effective in connection with non-combusting heat sources of various sorts. In any event it will be understood by those skilled in the art that many different heat sources and many diverse operating cycles may be used in conjunction with the MHD generator of this invention in order to produce the most compact, useful, and efficient operation.

FIG. 8 is a fragmentary isometric of an alternative construction for a polyphase MHD rotary induction device having a radially inward flow path. A flow duct is provided and comprises a pair of heat resistant members 41 and 42 which define a flow path 43 for the heated conductive gases. The members are so shaped that the duct has a radial portion 44 and a straight cylindrical portion 45. The heated conductive gas enters the duct portion 44 and is expanded to a high tangential velocity by means of a radial nozzle 46 which consists of a plurality of curved radial blades 47. The blades are so disposed in the duct that the high tangential velocity is imparted to the gas and the gas moves through the radially inward flow path 44 in a generally spiral movement as is indicated by means of the arrows in FIG. 9. An axially directed magnetic field is superimposed on the spirally flowing gas by means of a set of suitable magnetic structures indicated generally at 49. The axial field is time varying such that a travelling wave moves circumferentially around the radial path at a speed less than that of the gas velocity. The magnetic structure consists of a plurality of interspaced coils 50 distributed circumferentially around the radially inward flow portion 44. Hence, as the gas moves in a generally spiral radially inward path a rotating magnetic field, established by magnetic structure 49, is superimposed thereon and an interaction takes place between the tangential component of velocity of the conductive gas and the rotating magnetic field. The velocity of the gas and the rotating magnetic field is such that the gas moves at a higher velocity than the rotating magnetic field and energy is abstracted from the moving gas and appears in the form of an induced polyphase E.M.F. at the output terminals of the windings 49. After passing through the radially inward flow path 44 the conductive gas moves through the straight duct portion 41 and passes through a downstream stator 51 which consists of a plurality of radial vanes 52 to remove residual swirl from the moving conducting gas.

Although various forms of this invention have been shown, it will, of course, be understood that the invention is not limited thereto since many further modifications both as to the arrangement and the components employed may be made. It is contemplated by the appended claims to cover any such modifications which fall within the true spirit and scope of this invention.

What I claim as new and desire to secure by Letters Patent of the United States is:

1. In a magnetohydrodynamic induction device for generating alternating power, the combination comprising means defining a flow passage for a fluid, means for injecting a material into said fluid to make said fluid conductive, said last named means including a radial portion, flow control means disposed in the radial portion of said flow path for imparting a radially inward direction to said conductive fluid as it moves through said flow path defining means, magnetic means for impressing a rotating magnetic field on the radial portion of said flow passage which interacts with said rotating gas to produce a circulating current in said gas, said circulating current interacting with said magnetic means and including an alternating electromotive force therein.

2. In a magnetohydrodynamic induction device for generating alternating power, the combination comprising means defining a flow passage for a fluid, means for injecting a material into said fluid to make said fluid conductive, said last named means including a radial portion, flow control means disposed in the radial portion of said flow path for imparting a radially inward direction to said conductive fluid as it moves through said flow path defining means, magnetic means for impressing an axial rotating magnetic field on the radial portion of said passage which interacts with said rotating gas to produce a circulating current in said gas, said circulating current interacting with said magnetic means and inducing an alternating electromotive force therein.

References Cited by the Examiner

UNITED STATES PATENTS

| | | | |
|---|---|---|---|
| 1,298,664 | 4/19 | Chubb | 310—11 |
| 1,509,103 | 9/24 | Elliot | 310—11 |
| 2,224,505 | 12/40 | Ungar | 103—1 |
| 2,669,183 | 2/54 | Godbold. | |
| 2,730,951 | 1/56 | Donelian et al. | 310—11 X |
| 2,929,326 | 3/60 | Ingels | 310—11 X |
| 2,940,393 | 6/60 | Baker | 310—11 X |
| 3,091,709 | 5/63 | Rosa | 310—11 |

FOREIGN PATENTS

| | | |
|---|---|---|
| 648,937 | 9/37 | Germany. |
| 738,511 | 10/55 | Great Britain. |
| 1,052,548 | 3/59 | Germany. |

MILTON O. HIRSHFIELD, *Primary Examiner.*